(12) United States Patent
Myers et al.

(10) Patent No.: US 6,241,025 B1
(45) Date of Patent: Jun. 5, 2001

(54) AERATOR

(75) Inventors: James W. Myers, Eden Prairie; James C. Doring, Apple Valley, both of MN (US)

(73) Assignee: Jrco, Incorporated, Minneapolis, MN (US)

( * ) Notice: Subject to any disclaimer, the term of this patent is extended or adjusted under 35 U.S.C. 154(b) by 0 days.

(21) Appl. No.: 09/386,192

(22) Filed: Aug. 31, 1999

(51) Int. Cl.[7] .................................................. A01B 45/02
(52) U.S. Cl. .............................. 172/21; 172/42; 172/611; 172/43; 172/247; 172/541; 172/253
(58) Field of Search .................................. 172/21, 22, 42, 172/43, 48, 51, 245, 247, 250, 253, 611, 540, 541, 544, 662, 705; 56/256, 295; 111/135

(56) References Cited

U.S. PATENT DOCUMENTS

| | | | |
|---|---|---|---|
| 5,398,768 | * | 3/1995 | Staples ..................................... 172/21 |
| 5,398,769 | * | 3/1995 | Staples ..................................... 172/21 |
| 5,579,847 | | 12/1996 | Postema . |
| 5,586,604 | | 12/1996 | Postema . |
| 5,611,291 | * | 3/1997 | Pogue ...................................... 111/14 |
| 5,623,996 | | 4/1997 | Postema . |
| 5,784,872 | * | 7/1998 | Sadler ..................................... 56/364 |
| 6,041,869 | * | 3/2000 | Lewis et al. ............................ 172/21 |
| 6,102,129 | * | 8/2000 | Classen ................................... 172/21 |

OTHER PUBLICATIONS

Operator's Manual for JRCO Hooker Soft–Plug Aerator; JRCO, Inc. Sep. 1998.
Parts List for One Tine/Caster Assembly; diagram; no date given.
Diagram and description of the JRCO Hooker Soft–Plug Aerator; JRCO, Inc; no date given.
Brochure page for the JRCO Tine Rake Front–Mount Dethatcher with photos and design specifications; 1996.

* cited by examiner

*Primary Examiner*—Victor Batson
(74) *Attorney, Agent, or Firm*—Merchant & Gould P.C.

(57) ABSTRACT

A lawn aerator that is attachable to a piece of mechanized lawn care equipment, such as a self-propelled lawn mower, lawn tractor and the like, for aerating a lawn. The lawn aerator includes a frame having first and second opposite ends, with the frame including mounting structure connected thereto adjacent the first end to enable mounting of the frame to the piece of mechanized lawn care equipment. In addition, an aerator assembly is pivotally mounted on the frame so that the aerator assembly is pivotable relative to the frame between a ground engaging position and a disengaged position. The aerator assembly includes a plurality of caster assemblies each of which includes at least one tine head assembly including an aerator wheel connected to a pivot head.

22 Claims, 6 Drawing Sheets

AERATOR

FIELD OF THE INVENTION

The invention relates generally to an aerator for aerating the soil of a lawn, and more particularly relates to an aerator that attaches to a piece of mechanized lawn care equipment, such as a lawn mower, lawn tractor and the like, for aerating a lawn as the piece of mechanized lawn care equipment travels over the lawn.

BACKGROUND OF THE INVENTION

Lawn aeration is a vital component of any lawn care maintenance program. Aeration, which is often times performed two or more times a year, entails creating numerous small holes in the ground to increase air and oxygen absorption into the soil. Further, the holes also increase the amount of moisture that penetrates the soil, and enhances new grass seed growth and root development.

There have been numerous devices devised in the past for aerating a lawn. Such devices include shoes that are worn on the feet to aerate the lawn as the wearer walks on the lawn, devices that are manually pulled or pushed across the lawn to create aeration, and aeration machines that are specifically made for aeration only. Each of these approaches is time consuming, labor intensive and/or requires the purchase of expensive equipment having a single use only.

Another approach to aeration has been to utilize an aerator that attaches to a lawn mower so as to aerate as the lawn mower traverses the lawn. Examples of aerator attachments are found in U.S. Pat. Nos. 5,579,847; 5,586,604; and 5,623,996, each of which discloses an aerator that can be attached to the rear of a self-propelled mower such that the mower provides the power for pulling the aerator over the lawn.

While previous lawn aerator attachments have performed generally satisfactorily, there is a continuing need in the lawn care industry for an improved lawn aerator that is attachable to a piece of mechanized lawn care equipment for aerating the lawn as the piece of equipment is driven over the lawn.

SUMMARY

The invention provides an improved lawn aerator that is attachable to a piece of mechanized lawn care equipment, such as a self-propelled lawn mower, lawn tractor and the like, for aerating a lawn. Since the aerator of the invention attaches to mechanized lawn care equipment, the aeration job can be performed at higher speeds, thereby allowing for greater productivity. Further, the aerator is designed to quickly and easily attach to the mechanized equipment, thereby saving time and labor.

In one embodiment in accordance with the invention, a lawn aerator for attachment to a piece of mechanized lawn care equipment is provided. The lawn aerator includes a frame having fist and second opposite ends, with the frame including mounting structure connected thereto adjacent the first end to enable mounting of the frame to the piece of mechanized lawn care equipment. In addition, an aerator assembly is pivotally mounted on the frame whereby the aerator assembly is pivotable relative to the frame between a ground engaging position and a disengaged position. The aerator assembly also includes a plurality of caster assemblies each of which includes at least one tine head assembly comprised of an aerator wheel connected to a pivot head.

In another embodiment in accordance with the invention, a lawn aerating system is provided which comprises, in combination, a piece of mechanized lawn care equipment and an aerator mounted to the piece of mechanized lawn care equipment. The aerator includes a frame having first and second opposite ends, with the first end mounted to the piece of mechanized lawn care equipment. An aerator assembly is pivotally mounted on the frame whereby the aerator assembly is pivotable relative to the frame between a ground engaging position and a disengaged position. The aerator assembly also includes a plurality of caster assemblies. Each caster assembly includes at least one tine head assembly comprised of an aerator wheel connected to a pivot head.

An advantage of the invention is that the aerator assembly can be pivoted to the disengaged position when aeration is not desired, such as when traveling across a parking lot or other hard surface. Further, the mounting structure permits the aerator to be attached to the mechanized equipment, such as by clevis pins which allows the aerator to pivot relative to the mechanized equipment thereby permitting aeration on uneven ground.

The aerator is designed to be either mounted to the front or rear of the mechanized lawn care equipment. Preferably, the aerator is front mounted thereby increasing user safety, and providing better visibility to enable a user to see the aeration pattern for aligning the next aeration row. Further, a front mounted aerator does not jackknife when the mechanized equipment reverses direction. In either the front or rear mounted versions, the aerator attaches quickly and easily to the mechanized equipment via a mounting bar arrangement.

The caster assemblies of the aerator are each provided with at least one tine head assembly, and preferably a plurality of tine head assemblies. The tine head assemblies are mounted so that they are freely rotatable 360° without interfering with adjacent tine head assemblies, thereby permitting the mechanized equipment to make sharp turns without causing binding of the tine head assemblies. Further, a dirt shield is preferably attached to each pivot head of the tine head assemblies to block dirt from being thrown on the mechanized equipment and operator.

In one embodiment, an electric actuator is provided to selectively actuate the aerator assembly between the ground engaging position and the disengaged position, thereby allowing the equipment operator to pivot the aerator assembly to a transport (disengaged) position while remaining seated. In another embodiment, a handle is connected to the aerator assembly to permit manual actuation of the aerator assembly between the ground engaging position and the disengaged position.

In another embodiment of the invention, a tine head assembly for a caster assembly of a lawn aerator is provided. The caster assembly includes a caster pin. The tine head assembly includes a pivot head having a first end that is adapted to permit pivotal mounting of the pivot head on the caster pin and a second end spaced from the first end. The second end has a mass portion associated therewith, with the mass portion being of unitary, one-piece construction with the first end and the second end, and an aerator wheel is rotatably mounted on the pivot head.

The unitary, one-piece construction of the mass portion and the ends of the pivot head simplifies construction and assembly of the tine head assembly, and eliminates components such as bearing that are required in the prior art in order to rotatably mount a mass wheel.

A variety of additional advantages of the invention will be set forth in part in the description which follows, and in part will be obvious from the description, or may be learned by practice of the invention. The advantages of the invention will be realized and attained by means of the elements and combinations particularly pointed out in the claims. It is to be understood that both the foregoing general description and the following detailed description are exemplary and explanatory only and are not restrictive of the invention as claimed.

DETAILED DESCRIPTION

The invention relates generally to a lawn aerator that attaches to a piece of mechanized lawn care equipment for aerating the lawn as the equipment traverses the lawn. Preferably, the aerator is mounted on self-propelled lawn mowers, such as zero-turn mowers, commercial mowers and the like. However, the aerator could also be mounted on lawn and garden tractors, utility carts, and other lawn care machinery. Thus, mechanized lawn care equipment is meant to encompass lawn care machinery that is mechanically propelled, such as the aforementioned self-propelled lawn mowers, lawn and garden tractors, etc., whereby the aerator is pushed or pulled across the lawn by the power provided by the piece of lawn care equipment to which it is attached.

Figure 1:
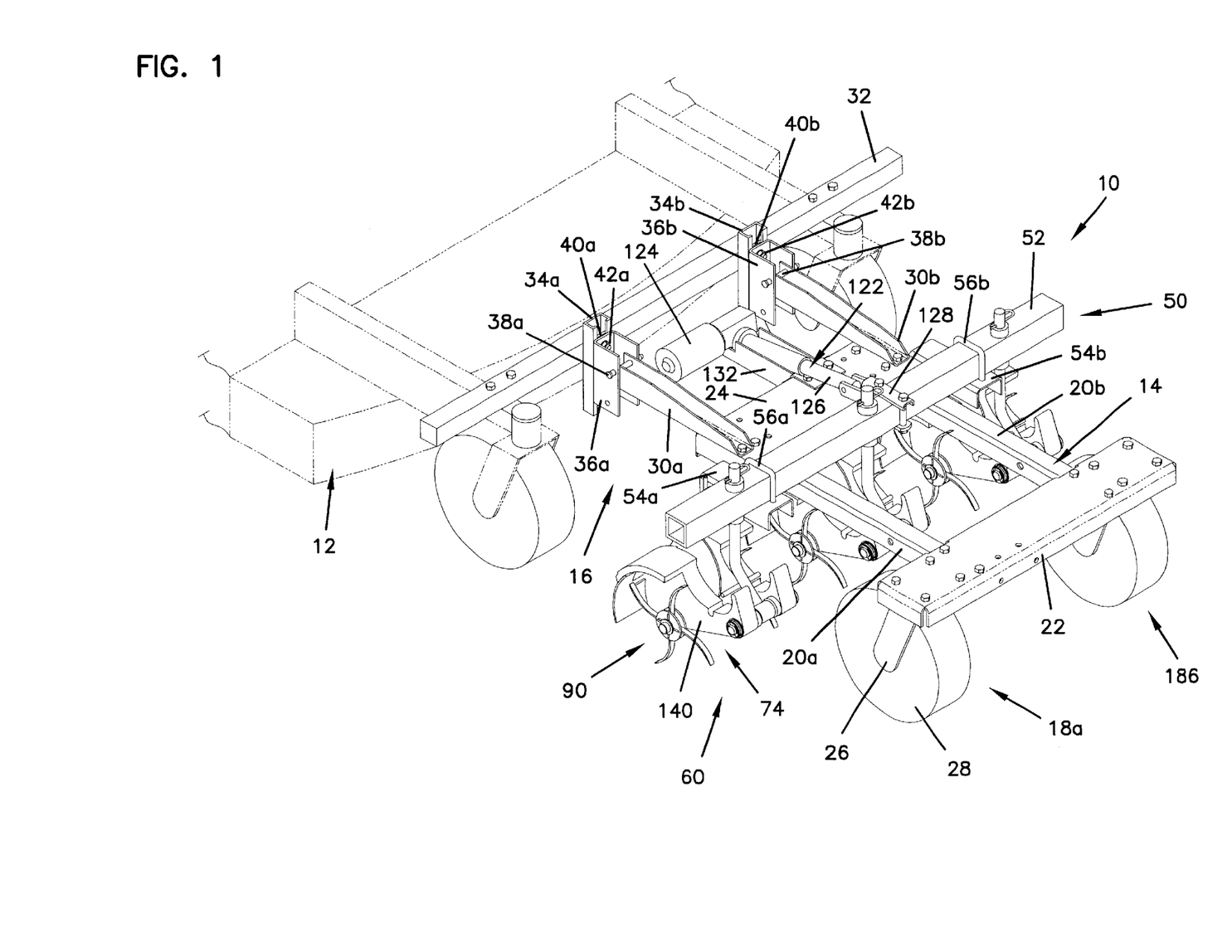
FIG. 1 is a perspective view of an aerator in accordance with the invention connected to the front end of a self-propelled lawn mower, with the aerator assembly in a ground engaging position.
Figure 2:
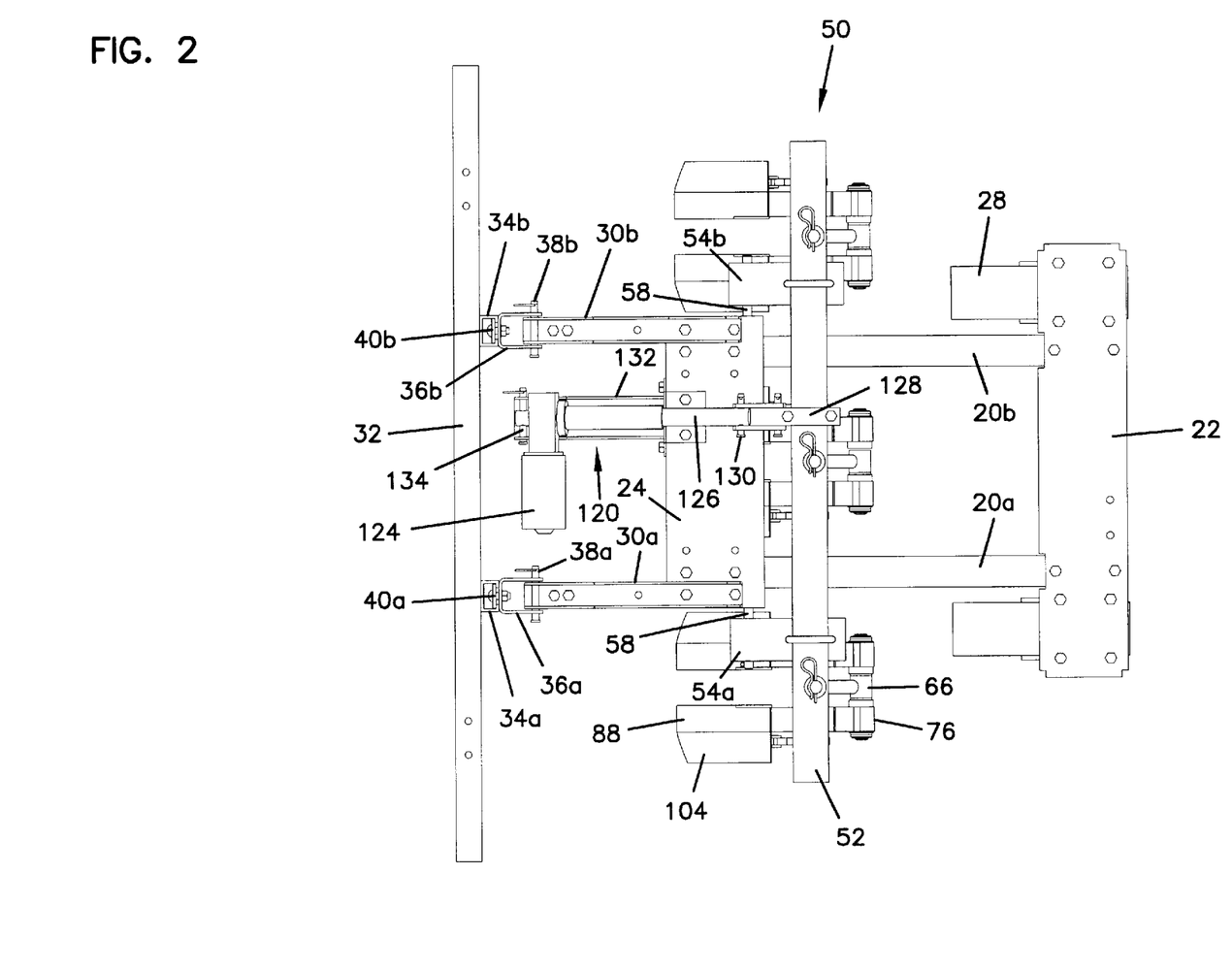
FIG. 2 is a top view of the aerator shown in FIG. 1. The front of the lawn mower is not shown for clarity.
Figure 3:
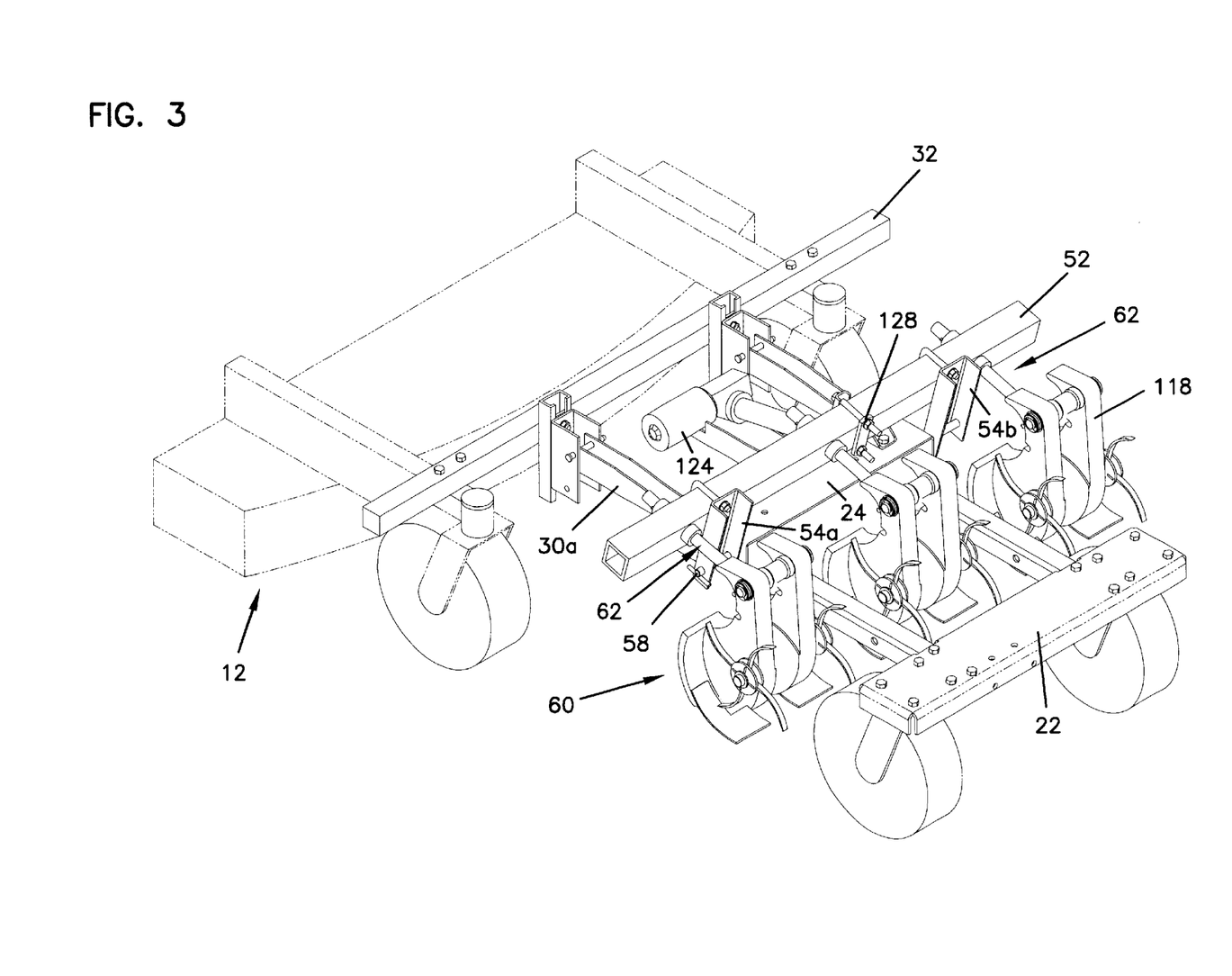
FIG. 3 is a view similar to FIG. 1, but with the aerator assembly pivoted upward to a disengaged position.

Referring now to the drawings in which like numerals refer to like parts throughout the several views, FIGS. 1–3 illustrate an aerator 10 embodying the principles of the invention in one preferred form. The aerator 10 is designed to be detachably connected to the front of a self-propelled lawn mower 12 partially shown in dashed lines in FIGS. 1 and 3. Although the aerator is specifically described herein as being mounted on a self-propelled lawn mower, the aerator could be mounted on other lawn care equipment as well.

The aerator 10 includes a generally rigid frame 14 having mounting structure 16 at one end to permit attachment to the front of the mower 12, and wheel assemblies 18a, 18b at the opposite end which roll upon the ground during use and which support the frame 14 at a generally constant height relative to the ground.

The frame 14 is generally rectangular in shape and includes first and second frame members 20a, 20b that are positioned in front of the mower 12 and are oriented generally parallel to the ground during use. A first plate 22 is connected to the distal ends of the frame members 20a, 20b and, and a second plate 24 is connected to the proximal ends of the frame members 20a, 20b, for maintaining the spacing of the frame members 20a, 20b.

The wheel assemblies 18a, 18b are mounted to the first plate 22 for supporting the front end of the frame 14. Each wheel assembly 18a, 18b is preferably a caster wheel assembly including a swivel yoke 26 connected to the plate 22 and a wheel 28 mounted on the swivel yoke 26, thereby allowing swiveling movement of the wheels 28. However, it is contemplated that other types of wheel assemblies could be used as well. Further, while two wheel assemblies 18a, 18b are described and shown, a larger number of wheel assemblies, or even a single wheel assembly, could be used as well. It is also contemplated that the aerator 10 could be used without any wheel assemblies connected to the frame 14.

In order to mount the aerator 10 to the mower 12, a mounting bar 32 is fixedly secured to the mower 12, and a pair of channel members 34a, 34b are fixed to the mounting bar 32, with the axes of the channel members 34a, 34b being perpendicular to the longitudinal axis of the mounting bar 32. The mounting structure 16 includes a pair of support arms 30a, 30b that are connected to the top of the plate 24 and extend toward the mower 12, in alignment with the channel members 34a, 34b. U-shaped brackets 36a, 36b are fixed to the channel members 34a, 34b, with the proximal ends of the support arms 30a, 30b being received within the brackets 36a, 36b, respectively. Clevis pins 38a, 38b extend through the brackets 36a, 36b and the support arms 30a, 30b, thereby pivotally connecting the support arms 30a, 30b, and the aerator 10 as a whole, to the mower 12. Conventional cotter pins or the like are preferably used to retain the clevis pins 38a, 38b in position.

Each bracket 36a, 36b preferably includes a rear clamping plate 40a, 40b that is disposed within the channel members 34a, 34b, with fasteners 42a, 42b (only one fastener being visible in each bracket) extending between the clamping plates 40a, 40b and the brackets 36a, 36b. By loosening the fasteners 42a, 42b, the brackets 36a, 36b can be adjusted up and down relative to the channel members 34a, 34b, thereby allowing vertical adjustment of the brackets to account for differences in mower design, and to level the frame 14 with the ground. The vertical position of the brackets is fixed by tightening the fasteners 42a, 42b, which clamps the channel members 34a, 34b between the clamping plates and the brackets.

It is to be realized that other mounting arrangements between the aerator 10 and the mower 12 could be utilized, as long as the aerator 10 is pivotable relative to the mower 12.

An aerator assembly 50 is mounted on the frame 14 for creating holes in a lawn as the mower travels across the lawn, thereby aerating the lawn. The aerator assembly 50 includes a caster bar 52 that is oriented generally parallel to the mounting bar 32 and perpendicular to the frame members 20a, 20b. A pair of pivot arms 54a, 54b are fastened to the underside of the caster bar 52 by U-bolts 56a, 56b or the like. As best seen in FIG. 2, the pivot arms 54a, 54b are located on opposite sides of the plate 24 and are generally level with the plate 24. With continued reference to FIG. 3, a pivot rod 58 extends between the pivot arms 54a, 54b and runs through the plate 24, thereby pivotally interconnecting the pivot arms 54a, 54b, and the rest of the aerator assembly 50, to the plate 24 and the rest of the frame 14, for a purpose to be described later in the description. The pivot rod 58 is preferably retained in place using a conventional cotter pin or the like.

A plurality of caster assemblies 60 are mounted to and extend downward from the caster bar 52 at spaced positions along the length thereof. In the embodiment illustrated in FIGS. 1–3, three caster assemblies 60 are mounted to the caster bar 52, although a larger or smaller number of caster assemblies could be used if desired. As illustrated in FIGS. 1–3, one caster assembly 60 is mounted to the caster bar 52 such that it is positioned outside of the frame member 20a, one caster assembly 60 is positioned between the frame members 20a, 20b, and the third caster assembly 60 is positioned outside of the frame member 20b.

Figure 5:
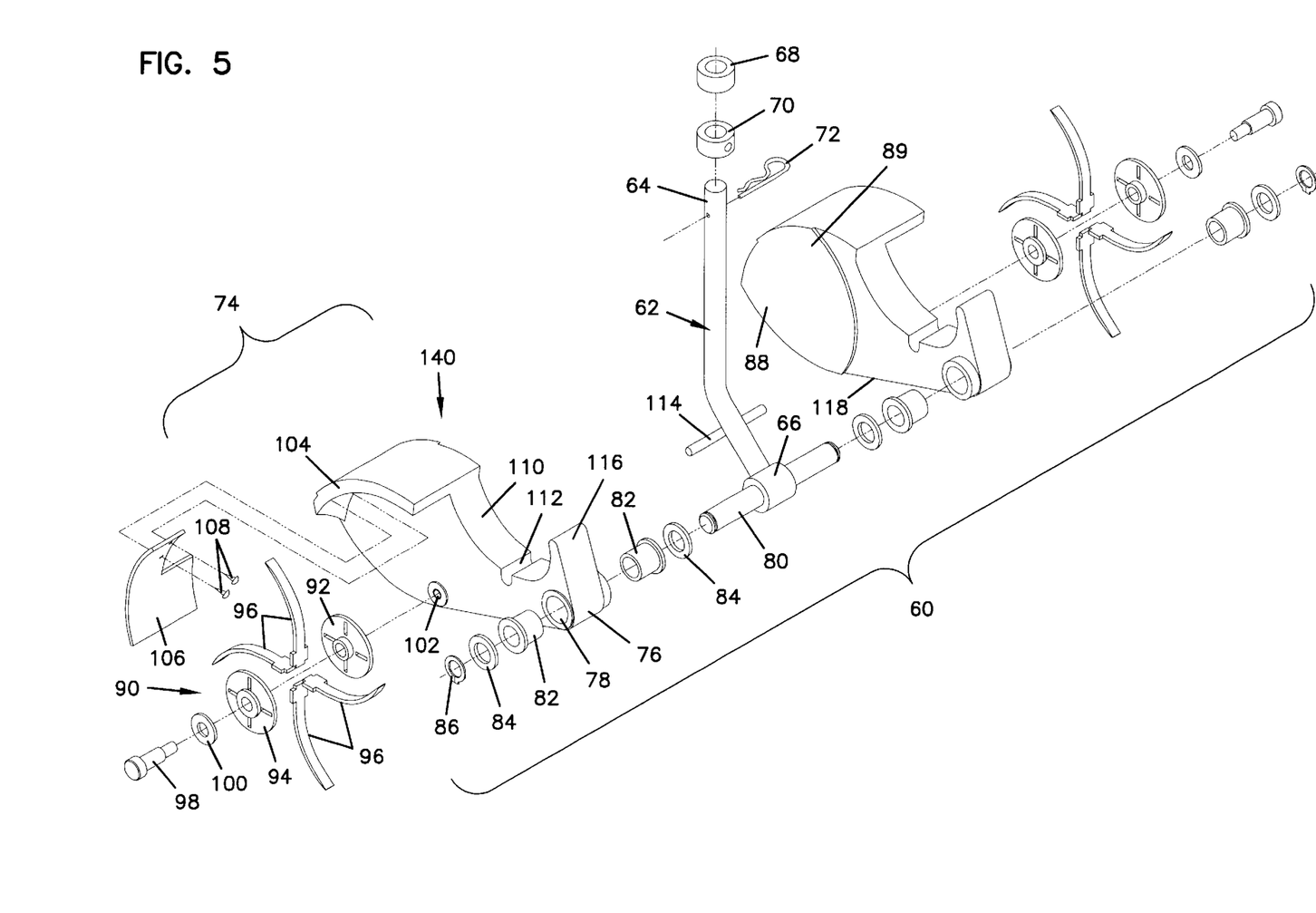
FIG. 5 is an exploded perspective view of the elements of one of the caster assemblies.

The caster assemblies 60 are generally identical to each other, with the details of the caster assembly 60 being illustrated in detail in FIG. 5. Each caster assembly 60 includes a caster pin 62 having an upper end 64 and a T-shaped lower end 66. The upper end 64 of the pin 62 extends freely through the caster bar 52, with the pin 62 being rotatably secured to the bar 52 by an upper shaft collar 68 and a lower shaft collar 70 disposed on either side of the bar 52. A cotter pin 72 or the like is used to vertically retain the pin 62 in position.

With reference to FIGS. 1 and 5, mounted on the T-shaped lower end 66 of the caster pin 62 are a pair of tine head assemblies 74, with the tine head assemblies 74 being mirror images of each other. Each tine head assembly 74 comprises a pivot head 140 of unitary one-piece construction of a heavy material, such as steel. The one-piece construction of the pivot head 140 simplifies construction of the tine head assembly 74, and makes assembly of the caster assemblies easier. Although a pair of tine head assemblies 74 are described as being mounted on each caster pin 62, a single tine head assembly 74 could be used for each caster assembly 60.

Each pivot head 140 includes a pivoted end 76 formed with a through hole 78 that receives therein an arm 80 of the T-shaped lower end 66. Flange bearings 82, washers 84 and a clip 86 are used to pivotally connect each pivot head 140 to the arm 80 of the lower end 66, thereby allowing the pivot head 140 to pivot vertically up and down relative to the caster pin 62.

The pivot head 140 further includes an opposite end 88 having a mass portion 89 associated therewith. The mass portion 89 is generally circular in shape, and is of unitary, one-piece construction with the ends 76 and 88. The combined mass of the mass portion 89 and end 88 is much greater than the mass of the pivoted end 76 so as to force the pivot head 140 downward toward the ground, which is useful during aeration as will become apparent later in the description. By making the mass portion 89 integral with the end 88, the use of a rotatably mounted mass and accompanying bearings is eliminated, and the manufacture and assembly of the tine head assemblies is simplified.

Each tine head assembly 74 further includes an aerator wheel 90 that is rotatably mounted on each pivot head 140 generally towards the second end 88 thereof. The aerator wheel 90 is similar to the aerator wheel disclosed in U.S. Pat. No. 5,623,996, and is therefore not described in detail herein. Briefly, the aerator wheel 90 includes a pair of rotor hubs 92, 94 which sandwich therebetween a plurality of tines 96 which, when rotated, create holes or pockets in the soil during aeration. A shoulder bolt 98 and washer 100 are provided to rotatably secure the aerator wheel 90 to the pivot head 140, with the shoulder bolt 98 extending into an internally threaded hole 102 provided in the pivot head 140.

Returning now to the tine head assemblies 74, FIG. 5 illustrates each pivot head 140 as being provided with an integral flange 104 on the side thereof containing the aerator wheel 90 and positioned generally above the aerator wheel 90 to prevent contact with the aerator wheel 90 during use, as well as to block soil that is thrown upward by the aerator wheel 90. Preferably, a flexible shield member 106 is fixed to the underside of the flange 104, by screws 108 or the like, and extends behind the aerator wheel 90 to further block soil from being thrown rearwardly onto the mower 12 and onto the operator of the mower. The flexible nature of the shield member 106 allows the shield 106 to contact the ground without damaging the lawn.

Turning to FIGS. 1, 3 and 5, each pivot head 140 further includes an arcuate upper surface 110 having a groove 112 formed therein. In addition, the caster pin 62 includes a stop rod 114 fixed thereto intermediate the ends 64, 66, with the stop rod 114 extending from each side of the caster pin 62. The stop rod 114 and the groove 112 are positioned relative to each other such that the groove 112 receives a portion of the rod 114 therein to limit rotation of the tine head assembly 74 in the clockwise direction when the aerator assembly 50 is in each of the positions shown in FIGS. 1 and 3. A projection 116 extends upwardly from the pivoted end 76 of the pivot head 140, and is sized to engage the stop rod 114 to limit rotation of the tine head assembly 74 in the opposite direction.

The shape of the pivot head 140 is also designed to enhance movement of the tine head assembly 74 over the lawn. Specifically, the bottom edge 118 of the pivot head 140 from the pivoted end 76 toward the second end 88 is made generally flat, as best seen in FIG. 3, to enable the tine head assembly 74 to slide over obstacles in the lawn without causing damage to the lawn.

As mentioned earlier in the description, the aerator assembly 50 is pivotally mounted on frame 14, thereby allowing the aerator assembly 50 to pivot relative to the frame 14 between a ground engaging position shown in FIG. 1 and a disengaged, raised position shown in FIG. 3. An actuating mechanism 120 is preferably used to actuate the aerator assembly 50 between its ground engaging position and the disengaged position.

In the embodiment shown in FIGS. 1–3, the actuating mechanism 120 is an electric mechanism utilizing an electrically driven actuator 122 driven by an electric motor 124. The actuator 122 includes an extendible arm 126 that is secured to the caster bar 52 via a clamp mechanism 128, with the end of the arm 126 being connected to the clamp mechanism through a pivot pin 130. The opposite end of the actuator 122 and the motor 124 are supported by an actuator mount 132 that is rigidly secured to the plate 24. Preferably, a pivot pin 134, best seen in FIG. 2, connects the actuating mechanism 120 to the actuator mount 132 to permit pivoting movement of the actuating mechanism relative to the actuator mount 132. Suitable wiring (not illustrated) will preferably be provided to allow the operator of the mower to control operation of the actuating mechanism 120 while remaining seated. Preferably, a switch will be accessible to the operator which controls the operation of the actuating mechanism 120.

Thus, the aerator assembly 50 is pivotable between the ground engaging position shown in FIG. 1 and the disengaged position by actuating the actuating mechanism 120 so as to extend and retract the arm 126. When the arm 126 is extended, the assembly 50 is in its ground engaging position. However, when the arm 126 is retracted, the caster bar 52 and the remainder of the aerator assembly 50 are pivoted about the pivot rod 58, as shown in FIG. 3, which raises the caster assemblies 60 off of the ground when aeration is not desired.

Figure 4:
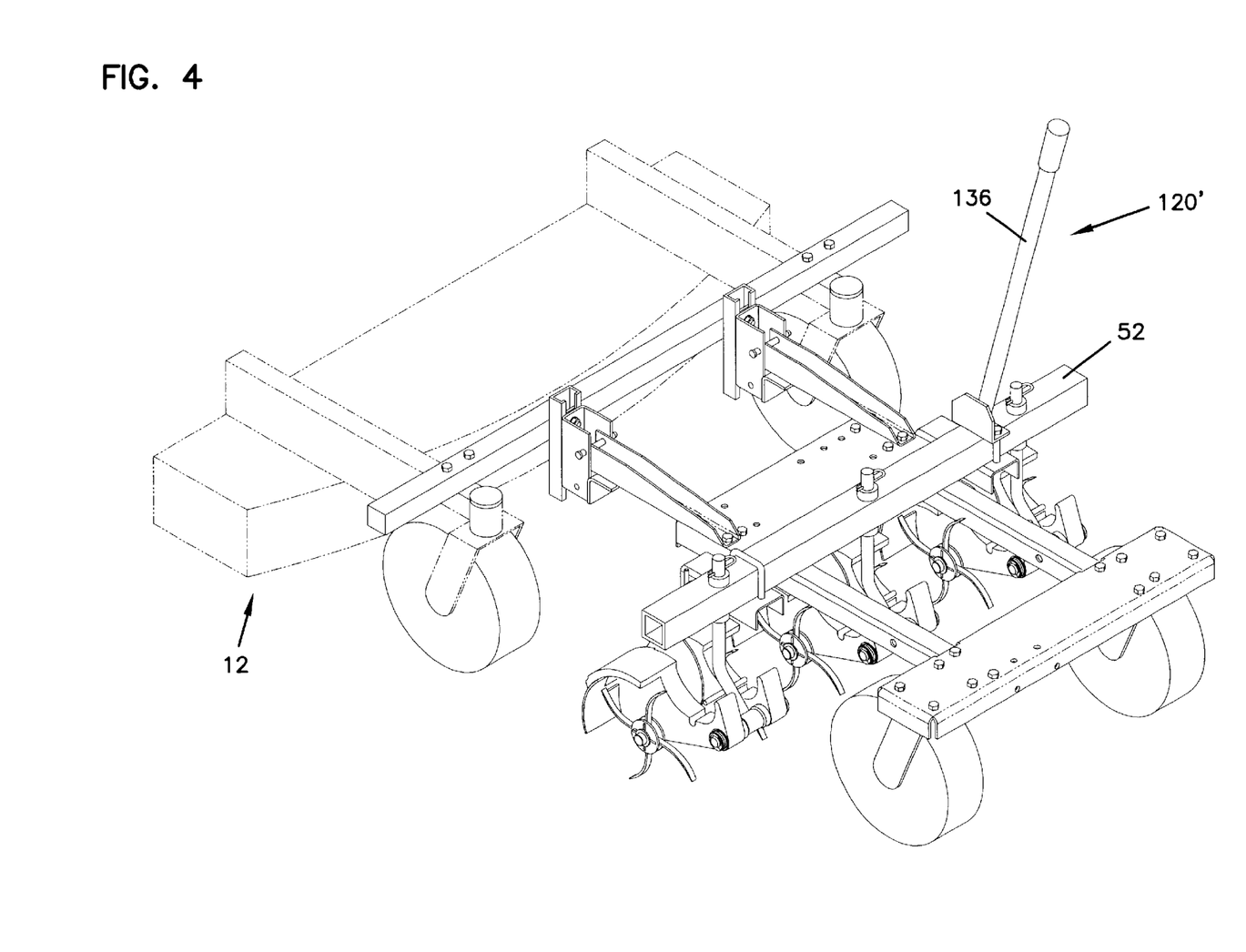
FIG. 4 is a view similar to FIG. 1, but showing the aerator with an actuating handle connected to the aerator assembly for manual pivoting of the aerator assembly between the ground engaging and disengaged positions.

Instead of using an electric actuating mechanism 120, a manual actuating mechanism 120' may be used instead. As illustrated in FIG. 4, the manual actuating mechanism 120' comprises a handle 136 that is securely fastened to the caster bar 52. By pulling the handle 136 toward the mower, the aerator assembly 50 is pivoted about the pivot rod 58 to the disengaged position, thereby raising the caster assemblies off the ground. A locking mechanism can be provided if desired in order to retain the aerator assembly 50 at the disengaged position.

Figure 6:
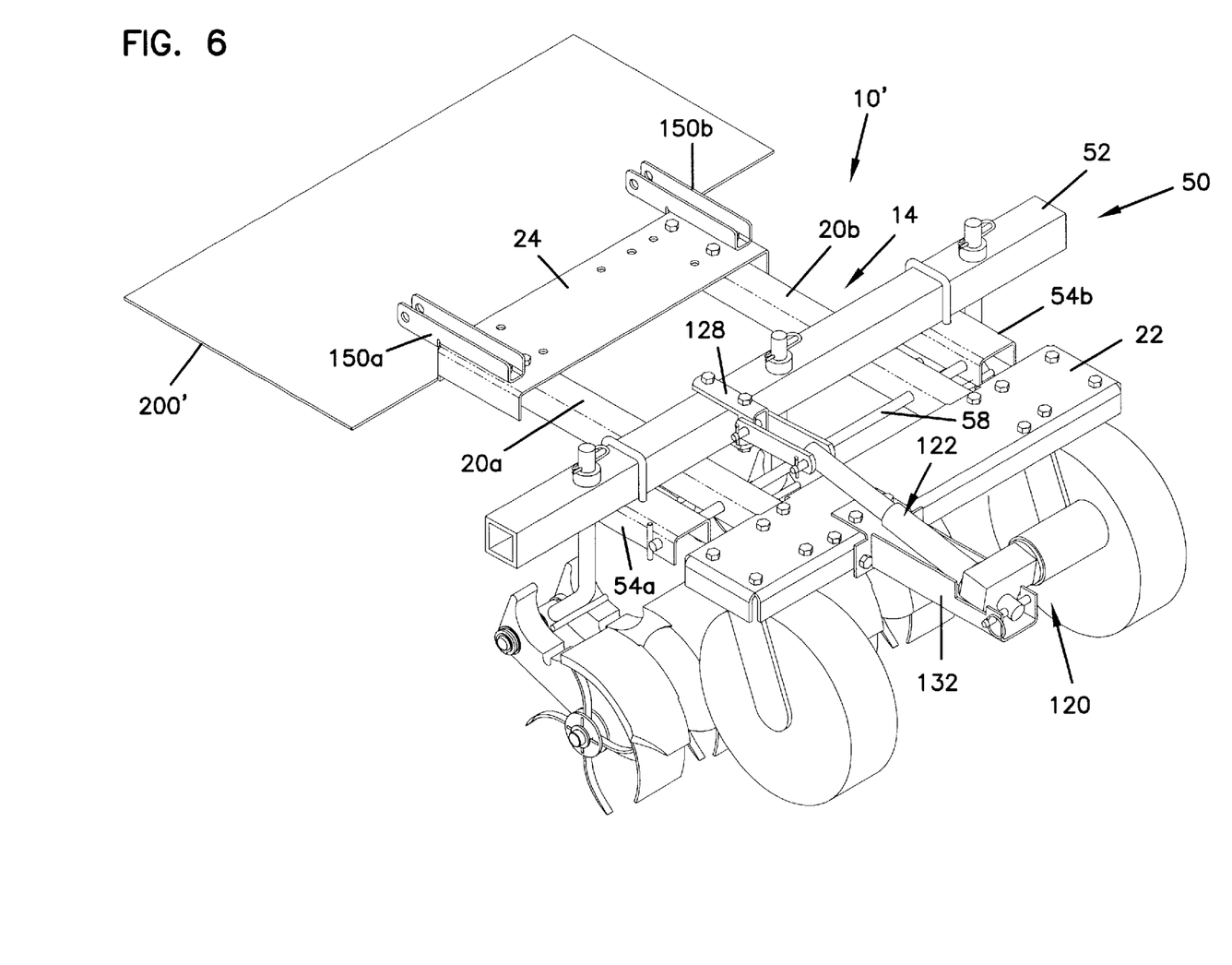
FIG. 6 is a perspective view of an alternate embodiment of the aerator adapted for attachment to the rear of a lawn mower or other mechanized lawn care equipment.

An alternative aerator 10' is illustrated in FIG. 6, in which the aerator 10' is designed to be attached to the rear of a mower or other mechanized lawn care equipment 200 so as to be pulled across the lawn to be aerated, rather than being pushed across the lawn to be aerated as with the aerator 10 shown in FIGS. 1–4. The aerator 10' has a construction that is very similar to the aerator 10, with like elements being referenced by the same reference numerals.

However, one difference between the rear mounted aerator 10' and the front mounted aerator 10 is the location of the pivot for the caster bar 52. In the aerator 10', the pivot arms 54a, 54b extend rearwardly toward the plate 22, and the pivot rod 58 extends through the pivot arms 54a, 54b and the frame members 20a, 20b so as to pivotally connect the aerator assembly 50 to the frame 14.

Another difference in the aerator 10' is the location of the actuating mechanism 120. In this embodiment, the actuator mount 132 is connected to the plate 22 and extends rearwardly therefrom. The actuator 122 then extends forwardly where it connects to the clamp mechanism 128 for causing pivoting of the aerator assembly 50 during extension and retraction of the actuator 122.

The remainder of the aerator 10' is substantially identical to the aerator 10, excluding support arms 150a, 150b extending from the plate 24 to permit pivotal attachment of the aerator 10' to the rear of a mower or other equipment.

Operation

The operation of the aerator will now be described. To simplify the description, only the operation of the aerator 10 that attaches to the front of the mower will be described, it being understood that the aerator 10' operates in a generally similar manner. The aerator 10 is attached to the mower 12 in the manner described above. When the aerator 10 is properly attached, the frame 14 should be generally parallel to the ground, with the wheels 28 resting on the ground, thereby supporting the frame 14 and maintaining the frame parallel with the ground. Mounting of the aerator to the front of the mower increases safety, since the aerator is spaced a relatively large distance from the operator, and the operator has better visibility of the aerator itself and its operation. Further, alignment of the next aeration row is easier as the aeration pattern on the lawn is readily seen.

Prior to actual aeration, the aerator assembly 50 will typically be pivoted upward to its disengaged position shown in FIG. 3, so that the caster assemblies 60 are not engaged with the ground, thereby allowing the mower, with the aerator attached thereto, to be driven without the caster assemblies contacting the ground. This is advantageous to allow the mower to be driven on hard surfaces, such as a parking lot, without causing damage to the caster assemblies, and to allow the mower to be driven from one location on a lawn to another location without causing aeration.

Once the desired aeration location is reached, the aerator assembly 50 is lowered by the operator to the ground engaging position shown in FIG. 1. In the ground engaging position, the aerator wheels 90 engage the ground, with the forward motion of the mower and the weighted, second end 88 of the pivot head 140 being sufficient to drive the tines 96 into the ground a certain depth during use. After the aerator assembly 50 is lowered, aeration can commence, with the operator driving the mower across the lawn to be aerated, thereby pushing the aerator as well.

As the aerator is pushed by the mower, the aerator wheels 90 are caused to rotate, with the tines thereof digging into the ground and removing small portions of soil, thereby creating numerous spaced pockets in the ground. Simultaneously, the rotor hubs 92, 94 hit ground, thereby maintaining a generally constant depth of penetration of the tines 96. As described, the pivot heads 140 are each independently pivotally mounted, such that in the event that the tines of one or more of the tine head assemblies encounter a root, rock or other hard object under the ground, or in the event that the bottom edge 118 of one or more of the heads slide over a bump on the ground, the tine head assembly 74 is able pivot upward to clear the obstruction, without interfering with the aeration operation of the other tine head assemblies. Further, the caster pins 62 permit each pair of tine head assemblies 74 to rotate 360° without obstruction from adjacent caster assemblies 60.

As the fines 96 dig into the ground, they tend to throw up the dirt that has been removed from the ground. However, the dirt shield 106 blocks the dirt from being thrown backwards onto the mower 12 and onto the operator of the mower.

The wheels 28 of the aerator 10 roll across the ground during use and maintain the frame 14 parallel with the ground. Applicant's have found that the frame must be parallel to the ground for proper aeration. In the event that uneven ground is encountered, the aerator 10 can pivot relative to the mower, due to the clevis pins 38a, 38b, to permit continued aeration.

When aeration is complete, the aerator assembly 50 is pivoted to the disengaged position by the actuating mechanism, thereby raising the caster wheels 90 off the ground to prevent further aeration. The groove 112, stop rod 114 and projection 116 function to limit the pivoting movement of each tine head assembly 74, at both the disengaged position and the ground engaging position, thereby preventing extreme swinging movements of the tine head assemblies which could potentially damage adjacent structure of the aerator 10, particularly during transport when the aerator assembly is at the disengaged position.

The aerator is described as being attached to a mower, such as a zero-turn mower or a commercial mower. Mounting of the aerator to a mower allows increased aeration speed for greater productivity. However, the aerator of the present invention could also be attached to many other types of equipment as well, as long as the other equipment can be driven across a lawn so as to push or pull the aerator.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A lawn aerator for attachment to a piece of mechanized lawn care equipment, comprising:
   a frame having first and second opposite ends, said frame including mounting structure connected thereto adjacent said first end to enable mounting of said frame to the piece of mechanized lawn care equipment; and a wheel assembly connected to said frame adjacent said second end for rolling engagement with the ground; and an aerator assembly pivotally mounted on said frame whereby said aerator assembly is pivotable relative to said frame between a ground engaging position and a disengaged position, said aerator assembly including a plurality of caster assemblies, each said caster assembly including at least one tine head assembly comprised of an aerator wheel connected to a pivot head having first and second ends wherein said second end includes a mass portion that is a unitary one-piece construction with said second end.

2. The lawn aerator according to claim 1, wherein said frame includes a second wheel assembly connected thereto adjacent said second end of said frame.

3. The lawn aerator according to claim 1, further including an actuating mechanism connected to said aerator assembly for pivoting said aerator assembly relative to said frame between the ground engaging position and the disengaged position.

4. The lawn aerator according to claim 3, wherein said actuating mechanism comprises an electrically driven actuator.

5. The lawn aerator according to claim 3, wherein said actuating mechanism comprises a handle.

6. The lawn aerator according to claim 1, wherein said aerator assembly is pivotable relative to said frame about an axis that is oriented generally parallel to the ground.

7. The lawn aerator according to claim 1, wherein each said caster assembly includes a pair of said tine head assemblies.

8. The lawn aerator according to claim 7, further including a flexible dirt shield connected to each one of said pivot heads.

9. The lawn aerator according to claim 1, wherein said frame is pivotally mountable to the mechanized lawn care equipment by said mounting structure, whereby said frame is pivotable relative to the mechanized lawn care equipment when mounted thereto.

10. A lawn aerating system comprising in combination:

a piece of mechanized lawn care equipment;

an aerator mounted to said piece of mechanized lawn care equipment, said aerator including:

a frame having first and second opposite ends, said first end mounted to the piece of mechanized lawn care equipment; and an aerator assembly pivotally mounted on said frame between said first and second opposite ends of said frame, whereby said aerator assembly is pivotable relative to said frame between a ground engaging position and a disengaged position, said aerator assembly including a plurality of caster assemblies, each said caster assembly including at least one tine head assembly comprised of an aerator wheel connected to a pivot head, wherein said pivot head includes first and second ends and a mass portion connected to said second end.

11. The lawn aerating system according to claim 10, wherein said piece of mechanized lawn care equipment comprises a riding mower.

12. The lawn aerating system according to claim 10, wherein said piece of mechanized lawn care equipment comprises a walk-behind mower.

13. The lawn aerating system according to claim 10, wherein said aerator is mounted to a front of said piece of mechanized lawn care equipment.

14. The lawn aerating system according to claim 10, wherein said aerator is mounted to a back of said piece of mechanized lawn care equipment.

15. The lawn aerating system according to claim 10, further comprising at least one wheel assembly connected to said frame adjacent said second end for rolling engagement with the ground.

16. The lawn aerating system according to claim 15, comprising a plurality of said wheel assemblies.

17. The lawn aerating system according to claim 10, wherein said first end of said frame is pivotally mounted to the mechanized lawn care equipment, whereby said frame is pivotable relative to the mechanized lawn care equipment.

18. A tine head assembly for a caster assembly of a lawn aerator, the caster assembly including a caster pin, comprising:

a pivot head having a first end adapted to permit pivotal mounting of the pivot head on the caster pin and a second end spaced from the first end, the second end having a mass portion associated therewith, the mass portion being of unitary, one-piece construction with the first end and the second end; and wherein the second end has a greater mass than the first end; and an aerator wheel rotatably mounted on said pivot head.

19. The tine head assembly according to claim 18, further including a flange formed adjacent the second end of the pivot head, said flange projecting from the pivot head at a position above the aerator wheel.

20. The tine head assembly according to claim 19, further including a flexible shield attached to said flange.

21. The tine head assembly according to claim 19, wherein the pivot head includes an upper surface extending between the flange and the first end, the upper surface including a groove formed therein.

22. The tine head assembly according to claim 18, wherein the pivot head includes a bottom edge that is substantially flat.

* * * * *